United States Patent Office 3,758,455
Patented Sept. 11, 1973

3,758,455
MYCOPHENOLIC ACID GLUCURONIDE AND THE PROCESS FOR THE PREPARATION THEREOF
Masahiko Arita, Tokyo, Japan, assignor to Chugai Seiyaku Kabushiki Kaisha, Tokyo, Japan
Filed May 4, 1971, Ser. No. 140,210
Claims priority, application Japan, May 14, 1970, 45/40,524
Int. Cl. C07c 47/18
U.S. Cl. 260—210 R                    2 Claims

ABSTRACT OF THE DISCLOSURE

A novel compound 6 - [4'-O-(β-D-glucopyranuronosido) - 6' - methoxy - 7' - methyl-3'-oxophthalanyl-(5')]-4-methyl-4-hexenoic acid which may be referred to as mycophenolic acid glucuronide having improved antitumor activity against mouse myeloid leukemia X–5563 and chemotherapeutic index is disclosed. The compound is prepared by reacting a mycophenolic acid alkyl ester or a salt thereof with a lower-alkyl-(2,3,4-tri-O-acetyl-α-D-glucopyranosyl halide)-uronate followed by hydrolysis.

DETAILED DESCRIPTION OF THE INVENTION

This invention relates to a novel compound 6-[4'-O-(β-D - glucopyranuronosido) - 6'-methoxy-7'-methyl-3'-oxophthalanyl-(5')]-4-methyl-4-hexenoic acid (hereinafter referred to as mycophenolic acid glucuronide) having the formula

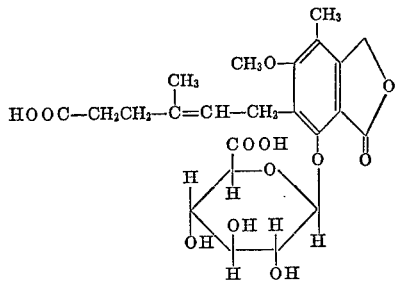

and a process for the preparation thereof.

The parent compound, mycophenolic acid, is an antibiotic found in the cultured product of *Penicillium brevicompactum* and is known to have a weak growth inhibiting activity on Gram-positive bacteria, fungi and yeasts. Recently, it was reported to have strong antitumor activity against transplantable solid tumors in a wide variety of laboratory animals, and the attention has been focused on its possible anticancer activity. However, mycophenolic acid has disadvantages in that, though it is fairly soluble in methanol and ethanol, it is sparingly soluble in water and other organic solvents and its therapeutic index is not satisfactory.

The present inventor made various investigations in order to eliminate the above drawbacks of mycophenolic acid and found that a condensation product of mycophenolic acid and glucuronic acid has improved properties in that it is easily soluble in water and in most organic solvents and also exhibits an excellent antitumor activity on certain specific tumors with a lower toxicity.

The object of this invention is therefore to provide a novel compound, mycophenolic acid glucuronide which is useful as antitumor agent having an excellent antitumor activity against mouse myeloid leukemia X–5563 and an improved solubility in solvents.

Another object of this invention is to provide a process for the preparation of mycophenolic acid glucuronide.

A further object of this invention will be apparent from the explanation described hereinbelow.

The process of this invention for the preparation of the above condensation product comprises reacting a mycophenolic acid lower alkyl ester with a lower alkyl-(2,3,4-tri-O-acetyl-α-D-glucopyranosyl halide)uronate (hereinafter referred to as a lower alkyl glucuronate) followed by hydrolysis of the resulting product.

The mycophenolic acid alkyl ester used as a starting material of this invention can be prepared from mycophenolic acid by any one of the conventional esterification procedures, for example, by reacting mycophenolic acid with a selected lower alkanol in the presence of an acid catalyst. The thus obtained mycophenolic acid alkyl ester may be used in a form of its salt such as an alkali metal salt.

In carrying out the process of this invention, a mycophenolic acid alkyl ester is dissolved in an appropriate organic solvent such as pyridine, quinoline, benzene, acetone or the like and reacted with a lower alkyl glucuronate in the presence of a heavy metal catalyst such as silver oxide, silver carbonate, mercuric cyanide, etc.

The process of this invention may also be carried out in the absence of the heavy metal catalyst when the mycophenolic acid alkyl ester is used in a salt form thereof. The salt of mycophenolic acid alkyl ester may be formed in situ so that the process may be carried out, for example, by adding an aqueous solution of an alkali hydroxide to a solution of mycophenolic acid alkyl ester in an organic solvent followed by the addition of a lower alkyl glucuronate to the resulting mixture.

The subsequent hydrolysis of the thus produced intermediate 6-[4'-O-(2'',3'',4''-tri-O-acetyl-methyl ester-α-D-glucopyranuronosido) - 6' - methoxy - 7' - methyl-3'-oxophthalanyl-(5')]-4-methyl-4-hexenoic acid methyl ester is carried out by adding a base such as sodium hydroxide, potassium hydroxide, sodium carbonate, etc. to the isolated intermediate or to the reaction mixture containing the intermediate from which the catalyst has been removed thereby effecting de-acetylation and de-esterification in the usual manner to yield the desired mycophenolic acid glucuronide in high yield. The thus obtained product may, if desired, be converted into its salt such as alkali metal salt by the procedure well-known to those skilled in the art.

Mycophenolic acid glucuronide of this invention is easily soluble in water and other solvents and exhibits low toxicity without causing serious side effects and therefore is useful as an agent having excellent antitumor activity against mouse myeloid leukemia X–5563.

The compound of this invention is biologically almost inactive in vitro but is active in vivo, i.e., it is a so-called "masked" compound, and the activity of the compound on laboratory tumor has been found to be about three times that of mycophenolic acid on the basis of the chemotherapeutical index.

EXPERIMENT 1

Antitumor activity (in vitro)

A suspension of L–5178Y cell containing $4.0 \times 10^4$ cells per ml. and 10% calf serum was prepared by using RPMI 1640 medium (Moore, G. E., Gerner, R. E., Franklin, H. A., J. Am. Med. Assoc., 199, 8: 87–92, 1967). Solutions of mycophenolic acid (MA) and mycophenolic acid glucuronide (MA-G) having various concentrations (diluent: RPMI 1640 medium) were then added separately to portions of the above-prepared cell suspension and, after being incubated for 48 hours at a temperature of 37° C., the number of cells in each of the cell suspensions was counted. As a control, the RPMI 1640 medium which was used as a diluent for the test compounds was employed in place of the solutions of test compounds.

Figure 1:
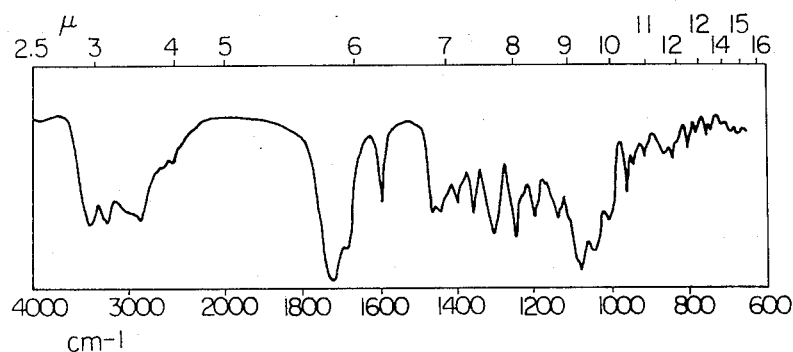
FIG. 1 is an infrared absorption spectrum of mycophenolic acid glucuronide of this invention.
Figure 2:
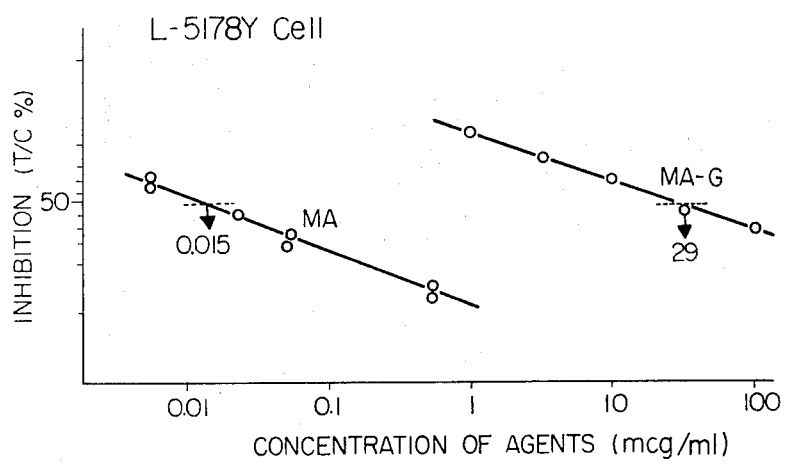
FIG. 2 is a graph showing a dose response of mycophenolic acid (MA) and mycophenolic acid glucuronide (MA-G) on L–5178Y tumor cell in Experiment 1.

From the results of the cell count, percent proliferation inhibition (T/C percent) was calculated by the following formula and the results are shown in FIG. 2:

Percent Proliferation Inhibition (percent)
$$= \frac{\text{Average cell counts in treated group}}{\text{Average cell counts in untreated control}} \times 100$$

From the dose response shown in FIG. 2, 50% inhibitory concentrations of mycophenolic acid and mycophenolic acid glucuronide are found to be 0.015 mcg./ml. and mcg./ml., respectively. The results indicate that the antitumor activity of mycophenolic acid glucuronide in vitro is about 1/2000 that of mycophenolic acid and, therefore, the activity shown by mycophenolic acid is considered to be "masked" in mycophenolic acid glucuronide.

EXPERIMENT 2

Effect on synthesis of DNA and RNA (in vitro)

A suspension of L–5178Y cell containing $1.5 \times 10^5$ cells per ml. and 10% calf serum was prepared by using Fischer's medium [Fischer, G. A., and Sartorelli, A. S., Methods in Medical Research, 10:247–262 (1964)]. Solutions of mycophenolic acid (MA) and mycophenolic acid glucuronide (MA–G) having various concentrations were then added separately to portions of the above-prepared cell suspension and the mixtures were incubated for 60 minutes at a temperature of 37° C. To each of the mixtures was then added 0.5 µCi/ml. of $^3$H-Thymidine and 1.5 µCi/ml. of $^3$H-Uridine, respectively, and the uptake amount of these radioactive agents during 30 minutes was determined. The results obtained are shown in Table 1.

TABLE 1.—THE EFFECTS OF MA AND MA–G ON THE MACROMOLECULAR SYNTHESIS IN L–5178Y CELL

| Dose (mcg./ml.) | $^3$H-TdR C.P.M. | $^3$H-TdR Percent | $^3$H-UR C.P.M. | $^3$H-UR Percent |
|---|---|---|---|---|
| MA 0.5 | 564 | 11 | 443 | 18 |
| MA 0.05 | 2,552 | 53 | 1,890 | 79 |
| MA 0.005 | 4,498 | 91 | 2,710 | 113 |
| MA–G 7.7 | 5,042 | 101 | 2,667 | 112 |
| MA–G 0.7 | 5,082 | 103 | 2,212 | 93 |
| MA–G 0.07 | 4,542 | 92 | 2,641 | 110 |

| | Minutes | |
|---|---|---|
| 0 | 60 | 90 |
| MA MA–G Administration | $^3$H-TdR $^3$H-UR Administration | Fix |

As is clear from the results in Table 1, mycophenolic acid at 0.5 and 0.05 mcg./ml. remarkably inhibits the uptake $^3$H-Thymidine and $^3$H-Uridine thereby interrupting the synthesis of DNA and RNA, while mycophenolic acid glucuronide, even at a concentration of 7.7 mcg./ml., does not show inhibitory action on the uptake of these radioactive agents, indicating that it does not adversely affect the synthesis of DNA and RNA.

It is concluded from the above experiments that the in vitro activity of mycophenolic acid glucuronide may be masked with the glucuronide bond in the molecule.

EXPERIMENT 3

Antitumor activity (in vivo) and toxicity

Five-week old male $C_3H/H$ mice (10 mice per group) were subcutaneously implanted at abdominal site with $1 \times 10^5$ cells of mouse myeloid leukemia X–5563. The administration of solutions of mycophenolic acid (MA) and mycophenolic acid glucuronide (MA–G) at various concentrations in physiological saline solution were then initiated 20 hours after the implantation and continued over five consecutive days once a day. The change in body weight as compared with that prior to the experiment was determined on the 7th day of the experiment and after the mice were sacrificed, the tumor was excised and weighed for investigating the effect of the test compounds. In the above experiment, a control group received only the same physiological saline solution as used for diluting the test compounds.

From the results obtained in the above experiment, percent proliferation inhibition (T/C percent) was calculated by the following formula and the results are shown in Table 2:

Percent Proliferation Inhibition (percent)
$$= \frac{\text{Average tumor weight in treated group}}{\text{Average tumor weight in untreated control}} \times 100$$

TABLE 2.—ANTITUMOR ACTIVITIES OF MA AND MA–G AGAINST X–5563 SOLID TUMOR

| | Agents | | | | | | | | |
|---|---|---|---|---|---|---|---|---|---|
| | MA–G | | | | MA | | | | |
| Dose (mg./head) | 50 | 32 | 10 | 3.2 | 5 | 3.2 | 1 | 0.3 | 0 |
| Average tumor weight (mg.) | 43 | 58 | 440 | 700 | 76 | 262 | 1,017 | 1,327 | 1,258 |
| T/C, percent | 3 | 4 | 35 | 55 | 6 | 20 | 80 | 105 | 100 |
| Average body weight change (g.) | 0.6 | 0 | 0 | 0 | −0.4 | 0 | 0.6 | 1.0 | 1.8 |

As is clear from the results in Table 2, a significant proliferation inhibiting activity is observed in the group receiving mycophenolic acid glucuronide at a dose of 50—10 mg. per mouse, and a remarkable reduction in body weight such as is often observed in other medications is not observed at the above dose of mycophenolic acid glucuronide.

Figure 3:
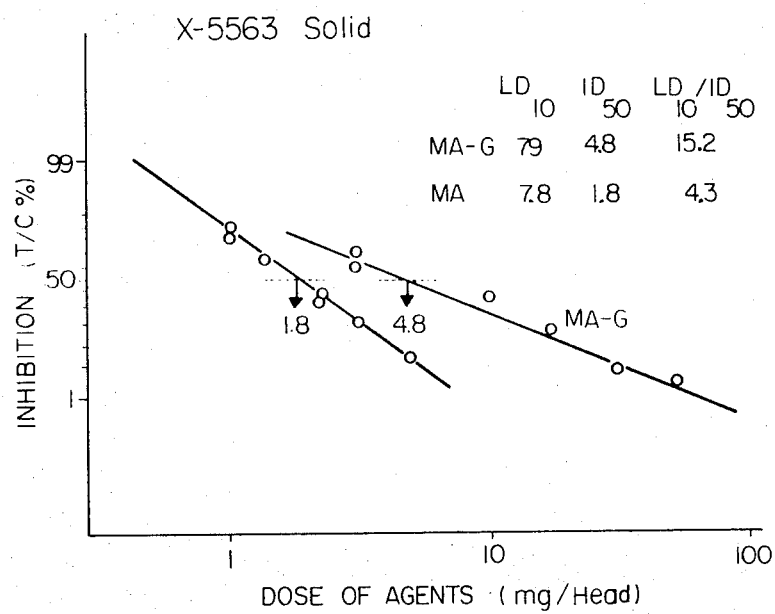
FIG. 3 is a graph showing a dose response of mycophenolic acid (MA) and mycophenolic acid glucuronide (MA-G) on mouse myeloid leukemia X–5563 cell in Experiment 3.

In order to determine the chemotherapeutic index, dose response curves shown in FIG. 3 are drawn from the results in Table 2. These curves indicate that $ID_{50}$ values of mycophenolic acid glucuronide (MA–G) and mycophenolic acid (MA) are 4.8 mg., and 1.8 mg., respectively.

Toxicity

In the same manner as above, five week-old $C_3H/H$ mice were subcutaneously administered with test compounds (mycophenolic acid and mycophenolic acid glucuronide) once a day for five consecutive days, and the mortality of the mice was observed during 20 days' test period. The $LD_{10}$ values obtained in this experiment were 79 mg./mouse for mycophenolic acid glucuronide and 7.8 mg./mouse for mycophenolic acid.

Chemotherapeutic index

From the proliferation inhibiting activity and toxicity shown above, the chemotherapeutic index is calculated to be 15.2 for mycophenolic acid glucuronide and 4.3 for mycophenolic acid. This result indicates that mycophenolic acid glucuronide is less toxic in the order of about 1/10 that of mycophenolic acid with a chemotherapeutic index of about three times that of mycophenolic acid.

EXAMPLE 1

2.8 g. of mycophenolic acid methyl ester was dissolved in 40 ml. of quinoline. 1.2 g. of silver carbonate was then added to the resulting solution and the mixture was stirred at room temperature for about 10 minutes. 2.4 g. of methyl-2,3,4-tri-O-acetyl-α-D - glucopyranosyl bromide)- uronate was added to the reaction mixture and, after stirring, for 3 hours, 80 ml. of benzene was added to dissolve the precipitated needle crystals, and the mixture was filtered through a layer of Celite 545 (available from Johns-Mansville Sales Co.). To the resulting filtrate was added 3 N hydrochloric acid, and the separated benzene layer was washed successively with water, 1 N aqueous potassium hydroxide and water, dried over anhydrous sodium sulfate and concentrated to give crystalline 6-[4'-O-(2",3",4"-tri - O - acetyl - methyl ester - $\beta$ - D - glucopyranuronosido) - 6'-methoxy-7'-methyl-3'-oxophthalanyl-(5')]-4-methyl-4-hexenoic acid methyl ester. Recrystallization from ethanol yielded 2.8 g. of colorless needle crystals, melting point 129–130° C., $[\alpha]_D^{20} = -22.2$ (c.=0.315, CHCl$_3$).

Analysis.—Calc'd for $C_{31}H_{38}O_{15}$ (percent): C, 57.23; H, 5.98. Found (percent): C, 57.14; H, 5.66.

Two grams of the above prepared 6-[4'-O-(2",3",4"-O-acetyl-methyl ester-$\beta$ - D - glucopyranuronoside) - 6'-methoxy-7'-methyl-3'-oxophthalanyl - (5')] - 4 - methyl-4-hexenoic acid methyl ester were dissolved in 20 ml. of acetone, and 20 ml. of 1 N sodium hydroxide aqueous solution was added thereto followed by standing for 15 minutes at room temperature. The reaction mixture was then de-salted with a cationic exchange resin Amberlite IR–120 (H form, available from Rohm & Haas Company) and concentrated in vacuo while maintaining the temperature below 40° C. The resulting semi-solid residue was recrystallized from ethanol-petroleum ether to give 1.3 g. of mycophenolic acid glucuronide, melting point 180–181.5° C. (decomposition), $[\alpha]_D^{20} = -64.2$ (c.=0.264, H$_2$O).

Analysis.—Calc'd for $C_{23}H_{28}O_{12}$ (percent): C, 55.64; H, 5.68. Found (percent): C, 55.78; H, 5.66.

EXAMPLE 2

3.4 g. of mycophenolic acid methyl ester was dissolved in 100 ml. of acetone and to the solution was added dropwise 20 ml. of 0.5 N potassium hydroxide aqueous solution while cooling with ice-water and stirring. The mixture was stirred for about 15 minutes, and 3.4 g. of methyl-(2,3,4-tri-O-acetyl-$\alpha$-D-glucopyranosyl bromide)-uronate was added to the mixture which was then reacted at room temperature for 72 hours while stirring. After completion of the reaction, acetone was distilled off in vacuo, and the reside was extracted with 150 ml. of benzene. The benzene extract was then washed successively with water, 1 N aqueous potassium hydroxide and water and worked up in the same manner as described in Example 1 to give 2.1 g. of mycophenolic acid glucuronide.

EXAMPLE 3

3.6 g. of mycophenolic acid methyl ester was dissolved in 50 ml. of quinoline and to the solution was added 1.5 g. of silver carbonate followed by stirring for about 10 minutes. 3.2 g. of methyl-(2,3,4-tri-O-acetyl-$\alpha$-D-glucopyranosyl bromide)-uronate was then added to the mixture and, after stirring for 3 hours, 100 ml. of benzene was added to dissolve the precipitated needle crystals. The resulting solution was then filtered through a layer of Celite 545 and 3 N hydrochloric acid was added to the filtrate. The separated benzene layer was washed successively with water, 1 N potsssium hydroxide aqueous solution and water, dried over anhydrous sodium sulfate and concentrated. The resulting residue was dissolved in 40 ml. of acetone, and, after adding 40 ml. of 1 N potassium hydroxide aqueous solution, the mixture was worked up in the same manner as described in Example 1 to give 2.5 g. of mycophenolic acid glucuronide as colorless needle crystals. The product had a melting point of 180–181.5° C. and did not show depression in melting point when it is admixed with the product obtained in Example 1.

What is claimed is:

1. 6-[4'-O-($\beta$-D-glucopyranuronosido) - 6' - methoxy-7'-methyl-3'-oxophthalanyl-(5')]-4-methyl - 4 - hexenoic acid.

2. An alkali metal salt of the compound in accordance with claim 1.

References Cited

UNITED STATES PATENTS

| | | | |
|---|---|---|---|
| 3,356,674 | 12/1967 | Ikeda et al. | 260—210 R |
| 3,629,231 | 12/1971 | Hough et al. | 260—210 R |

LEWIS GOTTS, Primary Examiner

J. R. BROWN, Assistant Examiner

U.S. Cl. X.R.

424—180

UNITED STATES PATENT OFFICE
CERTIFICATE OF CORRECTION

Patent No. 3,758,455     Dated September 11, 1973

Inventor(s) Masahiko ARITA

It is certified that error appears in the above-identified patent and that said Letters Patent are hereby corrected as shown below:

Column 4, line 35, delete "0.6" first instance and insert therefor -- -0.6 --.

Signed and sealed this 27th day of November 1973.

(SEAL)
Attest:

EDWARD M. FLETCHER, JR.     RENE D. TEGTMEYER
Attesting Officer     Acting Commissioner of Patents